United States Patent
Bergmann

(10) Patent No.: US 10,303,140 B2
(45) Date of Patent: May 28, 2019

(54) METHOD AND ELECTRONIC CONTROL UNIT FOR OPERATING AN ELECTRICAL ENERGY STORAGE SYSTEM

(71) Applicant: Robert Bosch GmbH, Stuttgart (DE)

(72) Inventor: Sven Bergmann, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 89 days.

(21) Appl. No.: 15/611,906

(22) Filed: Jun. 2, 2017

(65) Prior Publication Data

US 2017/0353051 A1  Dec. 7, 2017

(30) Foreign Application Priority Data

Jun. 3, 2016 (DE) .......................... 10 2016 209 787

(51) Int. Cl.
*G05B 15/02* (2006.01)
*H02J 7/00* (2006.01)

(52) U.S. Cl.
CPC ............ *G05B 15/02* (2013.01); *H02J 7/0004* (2013.01); *H02J 7/0021* (2013.01); *Y02T 10/7055* (2013.01)

(58) Field of Classification Search
CPC .... G05B 15/02; H02J 13/0017; H02J 7/0004; H02J 7/0021
USPC ........................................................ 700/295
See application file for complete search history.

(56) References Cited

U.S. PATENT DOCUMENTS

| 6,025,695 | A | * | 2/2000 | Friel ................. H01M 10/4257 112/130 |
| 10,035,515 | B2 | * | 7/2018 | List ........................ B60W 50/14 |
| 2009/0195368 | A1 | | 8/2009 | Kumik et al. |
| 2012/0166918 | A1 | | 6/2012 | Svendsli et al. |
| 2014/0062385 | A1 | | 3/2014 | Gaebler |
| 2016/0355189 | A1 | * | 12/2016 | Lin ........................ B60W 40/13 |
| 2017/0242079 | A1 | * | 8/2017 | Duan ................... B60L 11/1861 |
| 2017/0259687 | A1 | * | 9/2017 | Chikkannanavar .......................... B60L 11/1861 |

FOREIGN PATENT DOCUMENTS

| DE | 102009007171 | 9/2009 |
| DE | 102011089352 | 8/2012 |
| DE | 102012215208 | 3/2014 |
| DE | 102013222614 A1 | 5/2015 |
| DE | 102014202431 | 8/2015 |

\* cited by examiner

*Primary Examiner* — Chun Cao
(74) *Attorney, Agent, or Firm* — Michael Best & Friedrich LLP

(57) ABSTRACT

A method for operating an electrical energy storage system, wherein the electrical energy storage system has a plurality of components which fulfill the same purpose, and the method comprises: acquiring first feature data sets that identify the components in each case unambiguously in the energy storage system; comparing the acquired first feature data sets with second feature data sets stored in a first memory; in the case of a deviation between the first feature data sets and the second feature data sets that is established by the comparison, classifying the deviation; storing a value in a second memory depending on the classification of the deviation; and upon a predefined condition being fulfilled by the stored value, at least partly limiting a functionality of the electrical energy storage system.

9 Claims, 2 Drawing Sheets

METHOD AND ELECTRONIC CONTROL UNIT FOR OPERATING AN ELECTRICAL ENERGY STORAGE SYSTEM

BACKGROUND OF THE INVENTION

The present invention proceeds from a method for operating an electrical energy storage system, an electronic control unit for operating an electrical energy storage system, which electronic control unit is configured to carry out all the steps of the method according to the invention, and an electrical energy storage system, wherein the electrical energy storage system has in each case a plurality of components which fulfil the same purpose.

Present-day energy storage systems generally consist of a multiplicity of components that often fulfil the same purpose, for example a plurality of current sensors or a plurality of battery modules having integrated current sensors. Exchanging these components is often critical, since certain safety requirements, for example redundancy, have to be complied with. Therefore, in the event of a component exchange, a subsequent calibration may need to be performed, which, however, is to be carried out in a complex fashion in a corresponding specialist workshop. This is usually carried out independently of an actual necessity. A unique serial number is often used for identifying components, for example battery modules. A corresponding exchange can thereby be established.

The document DE 10 2009 007 171 A1 describes a diagnosis system and diagnosis method for detecting an improper intervention in the software or the calibration of a vehicle.

The document DE 10 2011 089 352 A1 discloses a battery management system and a corresponding method for checking configuration parameters in a battery management system.

The document DE 10 2012 215 208 A1 discloses a battery system and a method for recognizing unauthorized module exchange on a battery system.

The document DE 10 2014 202 431 A1 discloses an identification system for electrochemical energy stores.

SUMMARY OF THE INVENTION

The invention provides a method for operating an electrical energy storage system, an electronic control unit for operating an electrical energy storage system, which electronic control unit is configured to carry out all the steps of the method according to the invention, and an electrical energy storage system, wherein the electrical energy storage system has in each case a plurality of components which fulfil the same purpose.

In this case, the method for operating an electrical energy storage system comprises a plurality of steps, wherein the electrical energy storage system has a plurality of components which fulfil the same purpose.

A first step involves acquiring first feature data sets that identify the components in each case unambiguously in the energy storage system.

A second step involves comparing the acquired first feature data sets with second feature data sets stored in a first memory, in order to recognize possible deviations.

In the case of a deviation between the first feature data set and the second feature data set that is established by the comparison, classifying the deviation is carried out in a third step.

A fourth step involves storing a value in a second memory depending on the classification of the deviation.

Upon a predefined condition being fulfilled by the stored value, at least partly restricting the functionality of the electrical energy storage system is carried out in a fifth step.

It is thus possible to establish what components are currently present in the energy storage system and whether the present configuration of the energy storage system thus corresponds to the configuration stored in the first memory. Alterations can thereby be simply established and classified accordingly, which is helpful in the assessment of the further functionality of the energy storage system. By storing the value depending on the classification, it is thus possible to build up a change history and, if appropriate, to restrict the functionality of the energy storage system, for example by temporary deactivation, if for example safe operation of the energy storage system can no longer be ensured.

A restriction of the functionality of the electrical energy storage system may be for example continued operation with reduced power. It may thus be possible still to reach a specialist workshop.

Expediently, the first feature data sets and the second feature data sets at least partly correspond. Consequently, a simple comparability is ensured and alterations can be established rapidly.

In accordance with one embodiment, the first feature data sets in each case comprise a serial number or alphanumeric character sequence for unambiguously identifying the respective component. As a result, by way of example, an exchange of a component can be established in a simple manner on the basis of this unambiguous identification.

Advantageously, the second feature data sets in each case comprise a serial number or alphanumeric character sequence for unambiguously identifying components present in the energy storage system. A simple comparability between the first and the second feature data sets is thus provided.

Expediently, the components which fulfil the same purpose comprise sensors for detecting a current. In particular the current detection that is important for safe operation of the electrical energy storage system can thus continue to be operated safely even upon the exchange of current sensors, without the need for unnecessary visits to the workshop or stoppage of operation of the energy storage system. This is advantageous particularly in the case of a current sensor integrated into a battery module, since, by way of example, upon the exchange of such a module, it is thus possible to dispense with a possible calibration of the current sensor up to a certain number of exchanges.

Advantageously, the first feature data sets and/or the second feature data sets in each case comprise the position of the components in the electrical energy storage system. Consequently, without impairing the functionality, the components at a specific position can be exchanged repeatedly, without this requiring for example a recalibration of the energy storage system or of the corresponding components, since it can be recognized that an exchange has only ever taken place at the same position.

Preferably, in the fourth step, storing the value comprises incrementing a counter stored in the second memory. As a result, in particular the exact number of exchange or interchange processes that have taken place in the electrical energy storage system can be stored permanently. This ensures that even in the event of shutdown of the electrical energy storage system, this information remains stored and can be used for future evaluations and comparisons.

Expediently, in the fifth step the predefined condition comprises a limit value and at least partly restricting the functionality of the electrical energy storage system is carried out upon said limit value being reached or exceeded. It is thus possible for example to establish how many exchange processes are possible without the safety and/or functionality of the electrical energy storage system being impaired.

Furthermore, the invention relates to an electronic control unit which is configured to carry out all the steps of the method according to the invention, the advantages mentioned above being correspondingly applicable.

Furthermore, the invention relates to an electrical energy storage system which comprises a plurality of components which fulfil the same purpose and an electronic control unit according to the invention, the advantages mentioned above being correspondingly applicable.

BRIEF DESCRIPTION OF THE DRAWINGS

Advantageous embodiments of the invention are illustrated in the figures and explained in greater detail in the description below.

In the figures.

DETAILED DESCRIPTION

Identical reference signs designate identical device components or identical method steps in all of the figures.

Figure 1:
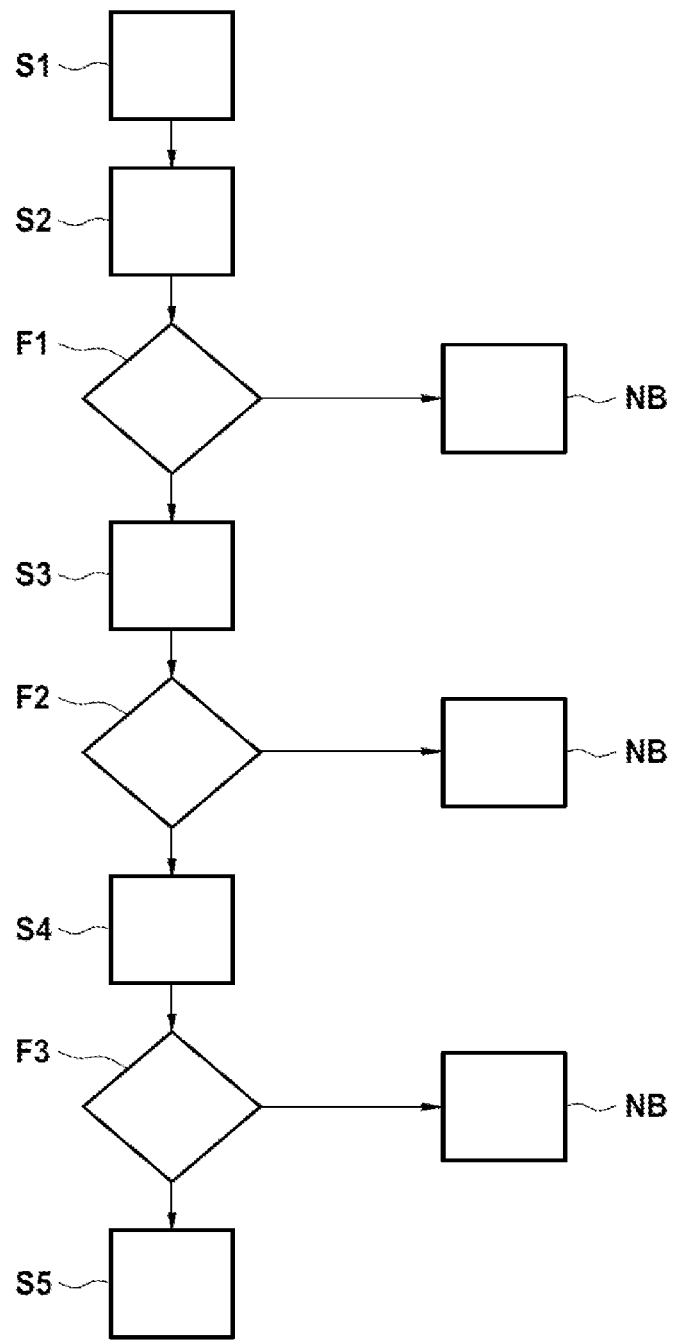
FIG. 1 shows a flow diagram of the method according to the invention for operating an electrical energy storage system in accordance with one exemplary embodiment.

FIG. 1 shows a flow diagram of the method according to the invention for operating an electrical energy storage system in accordance with one exemplary embodiment. A first step S1 involves acquiring all serial numbers and the installation positions of the modules with integrated current sensor that are incorporated in the electrical energy storage system, that is to say assemblies of electrical energy storage units. This may be carried out for example upon the starting of the electrical energy storage system or else at regular intervals during the operation of the electrical energy storage system. A second step S2 involves comparing the acquired serial numbers and the acquired installation positions of the incorporated modules with serial numbers and installation positions stored in a first memory. Said first memory may be provided for example by an electronic control unit. The serial numbers and installation positions stored in the first memory may describe for example a factory configuration, i.e. a basic state provided by the manufacturer of the energy storage system. By way of example, if a workshop-instigated exchange of a module in the electrical energy storage system occurred, the establishment F1 of a deviation between the new configuration of the electrical energy storage system and the configuration stored in the first memory is followed, in a third step S3, by classifying the deviation that was established between the serial numbers and installation positions of the modules incorporated in the electrical energy storage system and the serial numbers and installation positions stored in the first memory. If no such deviation is established, the electrical energy storage system continues to be operated in normal operation NB. After a corresponding assessment F2 of the deviation, incrementing a counter stored in a second memory is carried out in a fourth step S4. By contrast, if such a deviation is classified as noncritical, for example because a change of module was carried out at an installation position at which a change of module had already been carried out previously, the electrical energy storage system continues to be operated in normal operation NB. Normal operation means that the electrical energy storage system can carry out its intended operation without restriction. On account of the deviation at the same module position, the deviation had already been taken into account in an earlier performance of the method and is therefore not permitted to lead to a further incrementing of the counter. The counter thus counts the number of performed configuration changes classified as critical on the basis of a basic configuration, for example the factory configuration. In the case of a change classified as critical, for example the measurement value coming from the corresponding current sensor is then not taken into account in the electronic control unit for further processing, since said current sensor does not have a required calibration. After the checking F3 as to whether the counter exceeds a predefined limit value, at least partly restricting a functionality of the electrical energy storage system is carried out, if appropriate, in a fifth step S5. If the value of the counter does not exceed the limit value, the electrical energy storage system continues to be operated in normal operation NB. In an electrically operated vehicle, at least partly restricting the functionality may mean, for example, that the retrievable power, in particular also a current flowing in the battery, is restricted. Furthermore, by way of example, the necessity of a visit to a workshop can be indicated in a suitable manner, for example by means of an optical or acoustic signal.

Figure 2:
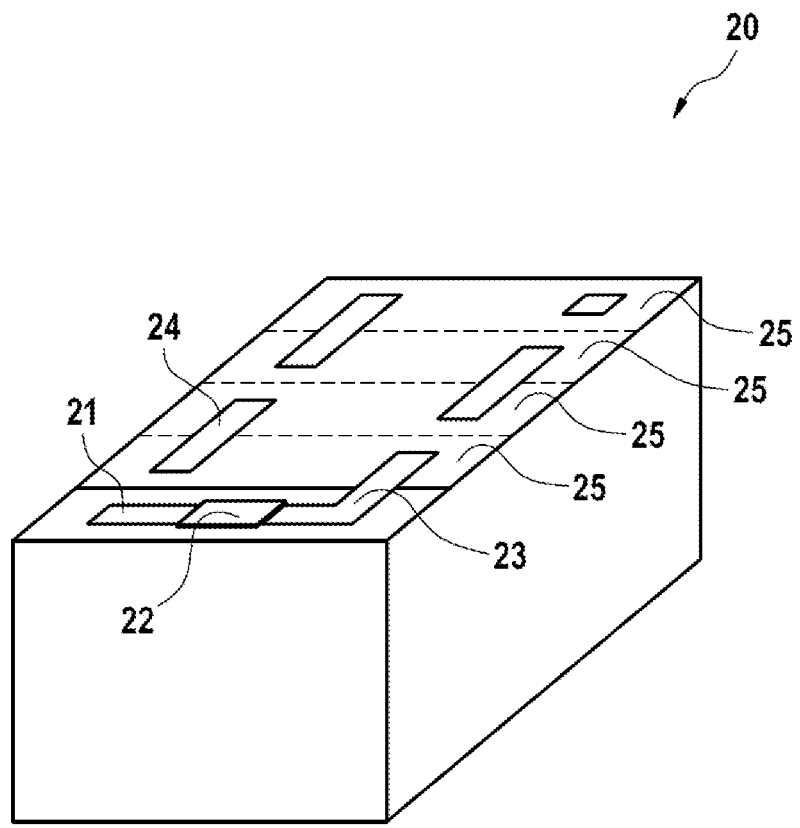
FIG. 2 shows a schematic illustration of a module with integrated current sensor.

FIG. 2 shows a schematic illustration of a module 20 with integrated current sensor 22. A connecting piece 23 for electrically connecting the current sensor 22 and an electrical energy storage unit 25 incorporated in the module is depicted here. A connecting piece 24 serves for electrically interconnecting the electrical energy storage units 25. A connection element 21 serves for connection to further modules which for example together form an electrical energy storage system. The current sensor 22 here is an integral part of the module and is also exchanged together with the latter. In order to avoid unnecessary calibration expenditure in association with the current sensor 22 upon the exchange of a module 20, the number of module exchanges is registered. In accordance with specific safety standards, a certain number of functional current detecting devices is required for safe operation of an electrical energy storage system. In an electrical energy storage system having a plurality of components of the same purpose, for example a plurality of modules 20, it is thus possible, if appropriate, for some of these modules 20 to be exchanged, without safe operation of the electrical energy storage system being jeopardized. This requires accurate tracking of the changes on the electrical energy storage system, for which purpose the proposed method can be used.

What is claimed is:

1. A method for operating an electrical energy storage system, wherein the electrical energy storage system has a plurality of components (20, 22) which fulfil the same purpose, comprising the following steps:
   a) acquiring first feature data sets that identify the components (20, 22) in each case unambiguously in the energy storage system;
   b) comparing the acquired first feature data sets with second feature data sets stored in a first memory;
   c) in the case of a deviation between the first feature data sets and the second feature data sets that is established by the comparison, classifying the deviation;

d) storing a value in a second memory depending on the classification of the deviation; and e) upon a predefined condition being fulfilled by the stored value, at least partly restricting a functionality of the electrical energy storage system.

2. The method according to claim 1, wherein the first feature data sets and the second feature data sets at least partly correspond.

3. The method according to claim 1, wherein the first feature data sets in each case comprise a serial number or alphanumeric character sequence for unambiguously identifying the respective component.

4. The method according to claim 1, wherein the components comprise sensors (22) for detecting a current.

5. The method according to claim 1, wherein the first feature data sets and/or the second feature data sets in each case comprise the position of the component (20, 22) in the electrical energy storage system.

6. The method according to claim 1, wherein step d) comprises incrementing a counter stored in the second memory.

7. The method according to claim 1, wherein in step e) the predefined condition comprises a limit value.

8. An electronic control unit for operating an electrical energy storage system, wherein the electrical energy storage system has a plurality of components (20, 22) which fulfil the same purpose, and wherein the electronic control unit is configured to a) acquire first feature data sets that identify the components (20, 22) in each case unambiguously in the energy storage system, b) compare the acquired first feature data sets with second feature data sets stored in a first memory, c) in the case of a deviation between the first feature data sets and the second feature data sets that is established by the comparison, classify the deviation, d) store a value in a second memory depending on the classification, and e) upon a predefined condition being fulfilled by the stored value, at least partly restrict a functionality of the electrical energy storage system.

9. An electrical energy storage system which comprises a plurality of components (20, 22) which fulfil the same purpose and an electronic control unit according to claim 8.

* * * * *